J. S. GEORGE & W. HOUGHTALING.
Machines for Cutting Cam-Grooves.

No. 137,358. Patented April 1, 1873.

Witnesses
A. Skaats
Edward A. Atwater

Inventors
John S. George
William Houghtaling

UNITED STATES PATENT OFFICE.

JOHN S. GEORGE AND WILLIAM HOUGHTALING, OF BRIDGEPORT, CONN.

IMPROVEMENT IN MACHINES FOR CUTTING CAM-GROOVES.

Specification forming part of Letters Patent No. 137,358, dated April 1, 1873; application filed August 12, 1872.

*To all whom it may concern:*

Be it known that we, JOHN S. GEORGE and WILLIAM HOUGHTALING, of Bridgeport, county of Fairfield, State of Connecticut, have invented an Improved Machine for Cutting the Grooves for Cams, of which the following is a specification:

The first part of our invention consists in the use of two cams secured to the spindle of machine, one of them operating on a stud secured to the bed-plate of machine, the other operating on a stud attached to a rack-bar that connects with the carriage of the machine; the object being to impart an irregular rotary and longitudinal motion to the spindle, and to oscillate the tool-holder affixed to the carriage. The second part consists in the arrangement of a cutting-tool in an oscillating holder attached to the carriage of the machine, and operating in conjunction with the spindle; the object being to present the cutting-edge of the tool always at a right angle to the cut in the cam.

Figure 1:
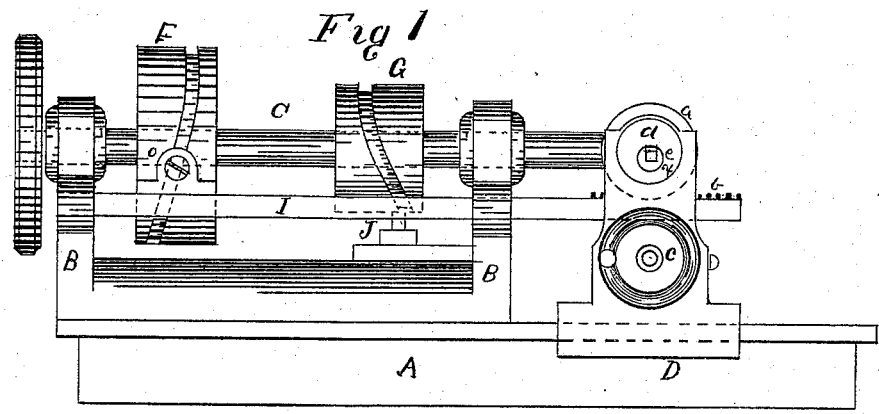
Figure 2:
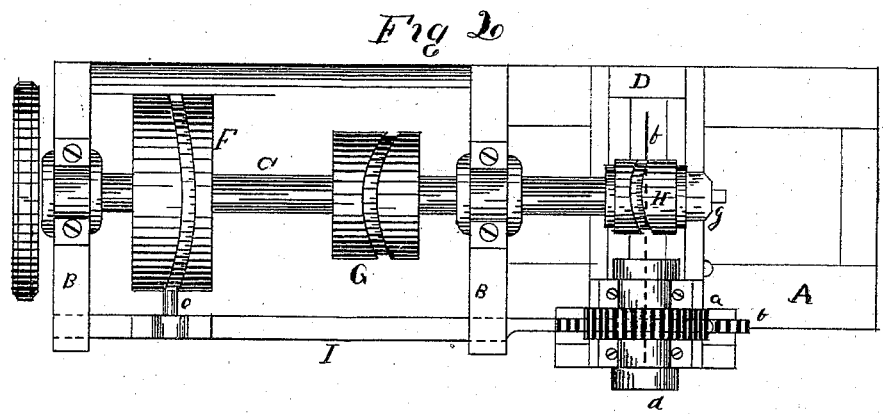
Figure 3:
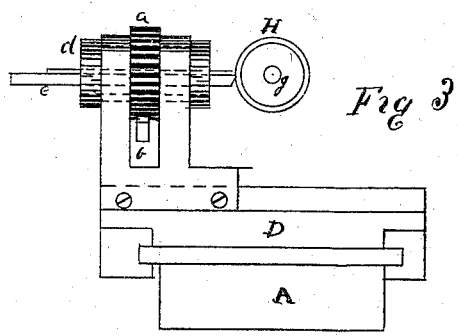

In the drawing, Figure 1 is a side view. Fig. 2 is a top view; Fig. 3, an end view.

Description.

A is the frame or bed; B B, the bearings for the spindle C; D, carriage; F, cam for rotating the tool-holder; G, cam for imparting the longitudinal motion to the spindle. H is a blank for a cam to be grooved; I, bar for conveying motion to the tool-holder; J, the stud on which the cam G works; *a*, pinion attached to the tool-holder; *b*, rack on bar I working into the pinion *a*; *c*, hand-wheel operating screw in carriage D; *d*, tool-holder; *e*, tool or cutter; *f*, screw by which the holder is operated on carriage.

Construction.

The frame A is similar in construction to those in general use for lathes or milling-machines. The bearings B B are cast to a base, and bolted to the frame. The spindle C is nicely fitted into the bearings B B. This spindle is turned of a size the whole length to the chuck *g*, and has a longitudinal and rotary motion. The chuck *g* is turned smaller than the spindle to form a shoulder. On the end same a thread is cut, and a holding-nut is fitted, by which the blank for the cam is held while the groove is cut. The cam G is fitted rigidly to the spindle C, and the groove in this is the same as that to be cut on blank H.

To impart the longitudinal motion to spindle C, the stud J is secured to the base of bearings B B, and nicely fits the groove in cam G, and the throw of the cam carries the spindle longitudinally while it revolves in the bearings B B. To impart the vibrating motion to the tool-holder *d*, the cam F is rigidly secured to the spindle C. The groove in this cam is arranged for imparting the desired motion to the holder, and the cam is itself nearly double the size of cam G. For the purpose of making the changes gradual and easy we connect this cam to the lever 1 by a friction-pin, *o*. This lever has bearings also formed in B B. On the opposite end of this lever the rack *b* is secured that works into the pinion *a*.

The cutter or tool-holder *d* is nicely fitted to uprights secured to the carriage D by gib or equivalent. Longitudinally through this holder a hole is drilled eccentrically to its center, and a plug nicely fitted to it, in which the groove for tool is planed, the upper edge of same central to the holder *d*. Between the supports for the holder *d* sufficient room is allowed for clearance of rack *b* as it works back and forth to and from the spindle. Between these uprights the pinion *a* is fitted and secured to the holder, and receives motion from the rack *b*. The cutter or tool *e* is secured by a wedge.

The operation of the machine is as follows: A blank for cam is trimmed to the proper diameter, and is firmly secured into the chuck *g* by the nut. In setting the cutter allowance is made for the throw of cam. The spindle is then set in motion, and the cam G throws the spindle C longitudinally; this, combined with the rotary motion, describes the same form on the blank to be cut, the cam F turning the holder, keeping the cutter always at right angles to the cut. The cutter is fed up to its work by the screw *f* and hand-wheel *c*.

Claims.

What we claim as new, and desire to secure by Letters Patent, is—

1. The combination of the spindle C, the cams G and F, the rack-bar I, studs J and O, a carriage, D, substantially as described.

2. The combination of the cutting-tool e, tool-holder d, pinion a, rack b, and bar I with the carriage D and its adjusting-screw, substantially as described.

In testimony whereof we have signed our names to this specification before two subscribing witnesses.

JOHN S. GEORGE.
WILLIAM HOUGHTALING.

Witnesses:
 EDWARD A. ATWATER,
 A. SKAATS.